Patented Oct. 16, 1923.

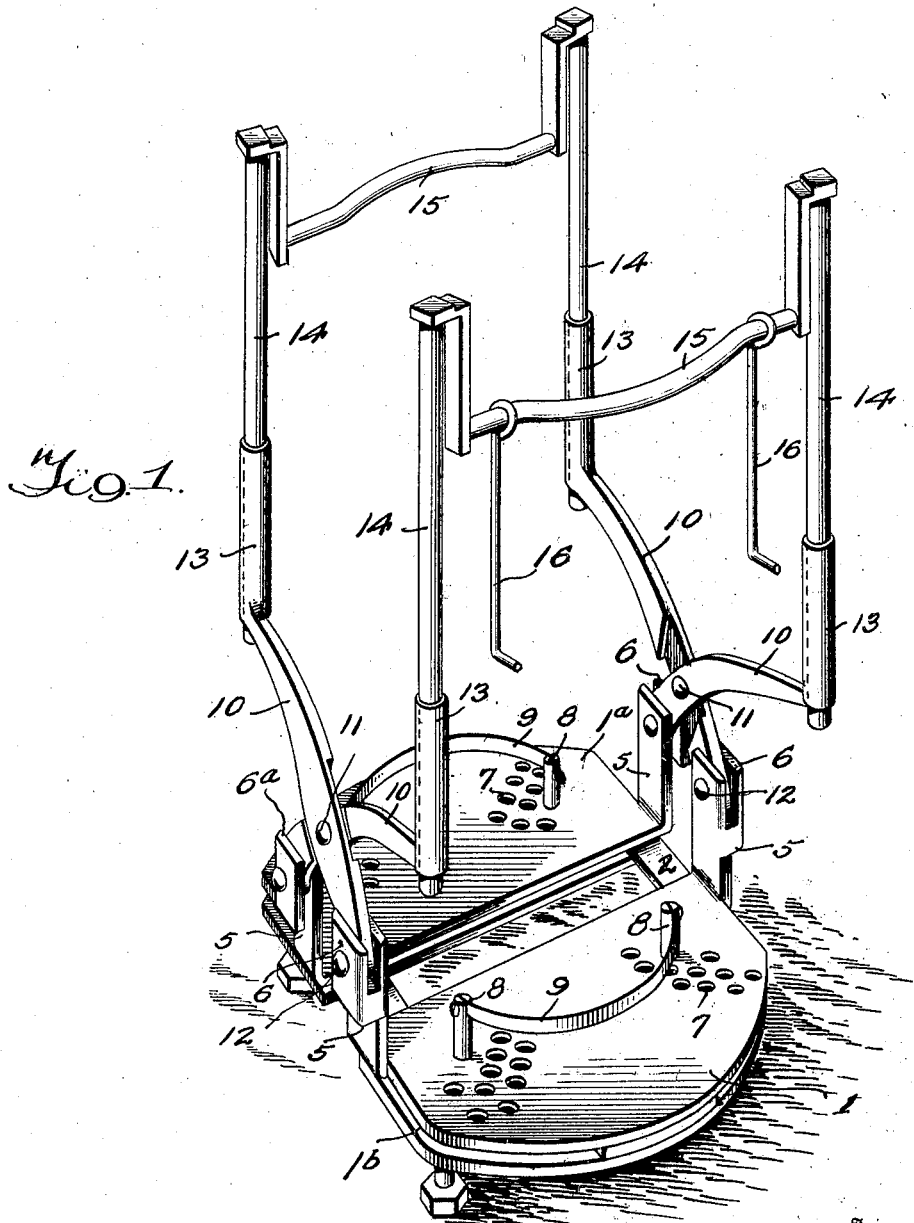

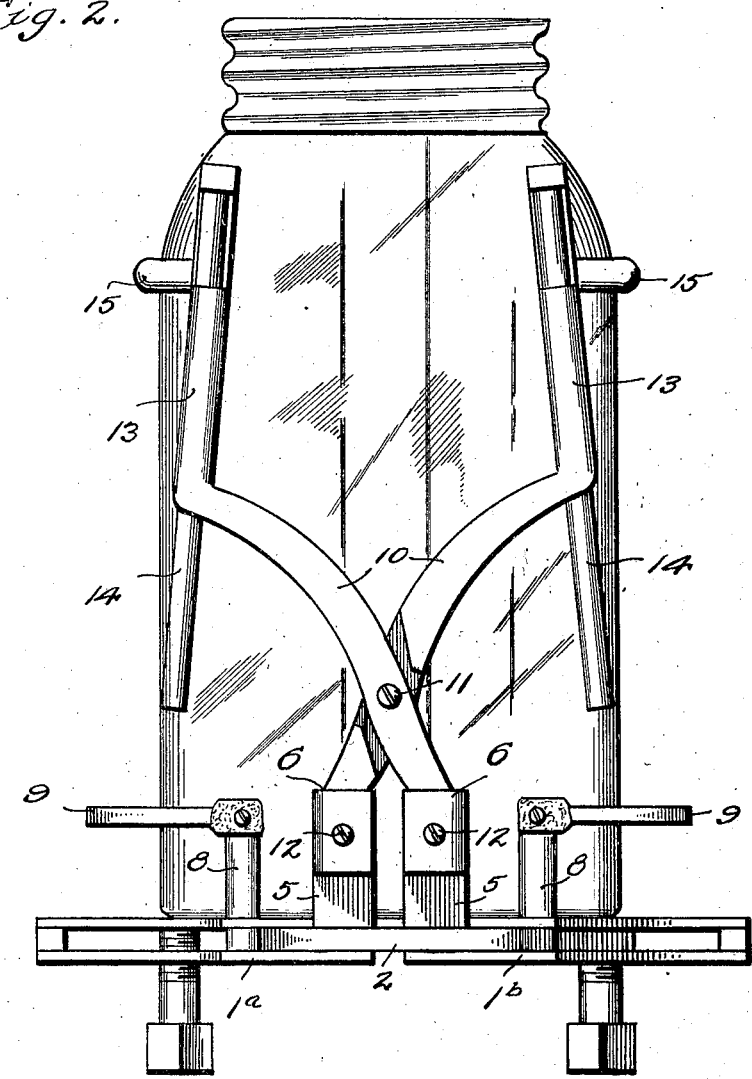

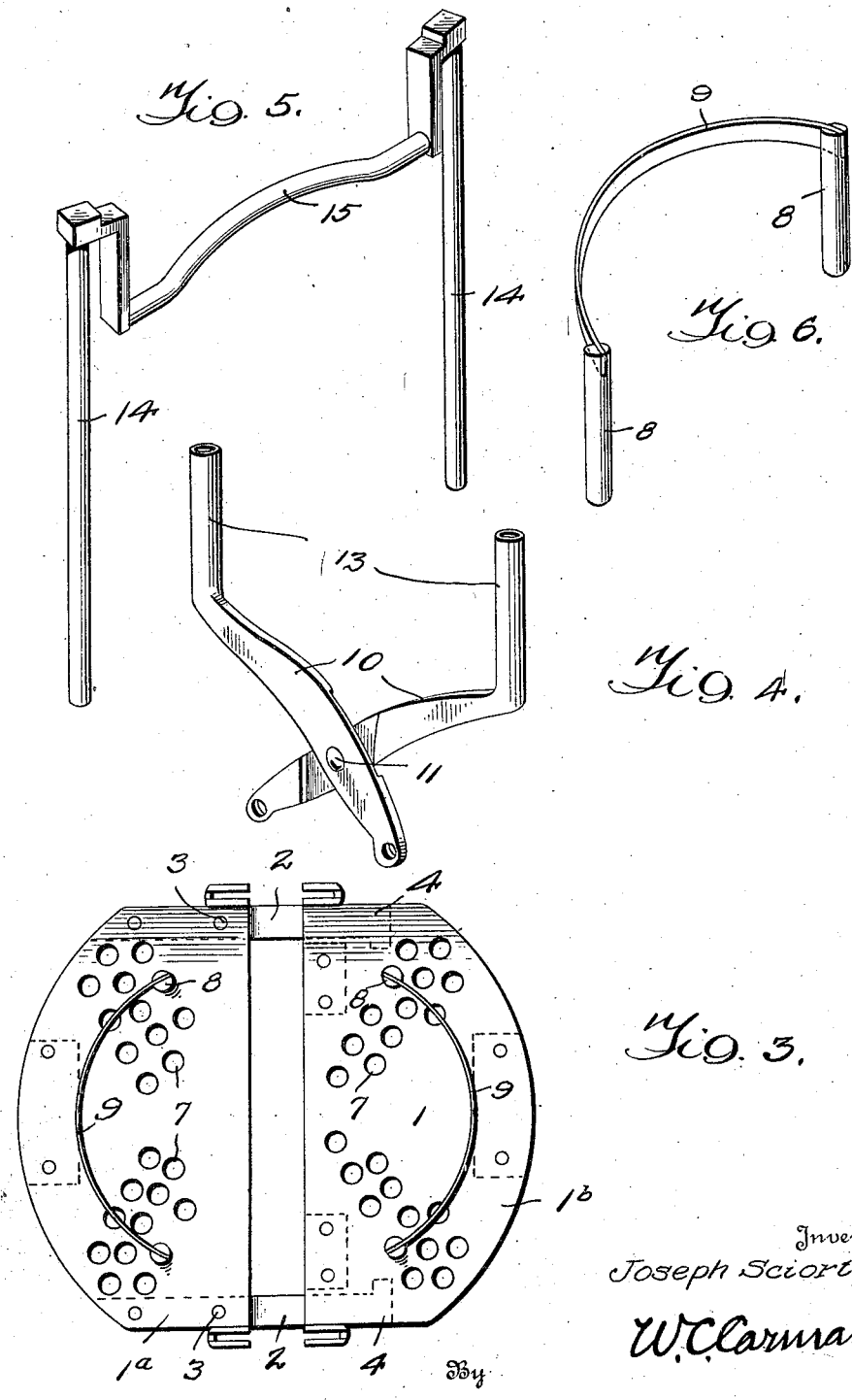

1,471,069

UNITED STATES PATENT OFFICE.

JOSEPH SCIORTINO, OF YOUNGSTOWN, OHIO.

JAR OR BOTTLE CLAMP.

Application filed April 3, 1922. Serial No. 549,183.

*To all whom it may concern:*

Be it known that I, JOSEPH SCIORTINO, citizen of the United States, residing at Youngstown, in the county of Mahoning and State of Ohio, have invented certain new and useful Improvements in Jar or Bottle Clamps, of which the following is a specification.

This invention relates to jar vises or holders,—the object being to provide a convenient and effective device for firmly holding the jar while turning the cap on or off, as well as for heating the jar and its contents if desired, and without danger of breaking the jar.

In the drawing, Figure 1 is a view in perspective.

Figure 2 is a side elevation, showing the device in operative relation with a jar in position to be operated upon.

Figure 3 is a plan view of the sectional base carrying the gripping elements.

Figures 4, 5 and 6 are detail views in perspective.

The same reference characters designate corresponding parts of the device throughout the various figures of the drawings.

1 represents the base composed of two sections 1ª and 1ᵇ which are slidably or adjustably connected by means of bars 2 rigidly attached to 1ª, as at 3, and slidably engaging 1ᵇ, as at 4.

Section 1ª and section 1ᵇ is each provided, adjacent its inner edge, with uprights 5, each carrying at its upper end the forked bracket 6. Each of said sections is also provided with a plurality of openings 7 for the accommodation of the gripping or holding posts 8, and for convenience each pair of these gripping posts may be tied together by the metal band 9.

10 represents clamping arms pivotally connected, as at 11, the inner ends of which are swingingly secured in the forked brackets 6, by means of rivets or bolts 12, while the outer ends are provided with tubular extensions 13. Slidably engaging the tubular extensions 13 are the rods 14 which are tied together at their outer ends by the cross-bars 15, thus forming what may be termed "clamping" handles for the operation of the device, and because of their sliding engagement with the tubes 13, they may be drawn outwardly to conform to the height of the jar in order that the upper gripping elements 15 may embrace the jar at its upper end rather than near the center, thus avoiding danger of breaking the jar. Holding hooks 16 may be mounted upon one of the cross-bars 15, and adapted to swing into engagement with the opposite cross-bar for the purpose of holding the device in operative relation.

As suggested above, the base is provided with a plurality of openings 7 to receive the gripping posts 8, in order that the posts may be adjusted to the size of the jar to be operated upon.

In operation the jar is placed upon the base inside of the gripping posts 8, while the two sections 1ª and 1ᵇ are separated by forcing or pulling the operating handles outwardly; then the handles are forced inwardly, thus drawing the base sections 1ª and 1ᵇ towards each other and causing the gripping posts 8 to engage the periphery of the jar at the bottom, while the cross-arms or bars 15 will simultaneously engage the upper end of the jar, when the hooks 16 may be swung into holding engagement, and the jar will be securely clamped for operation.

I claim:

1. In an article of the character described, a base composed of two sections slidably connected, holding elements in said base, operating levers pivoted to each other intermediate their ends and swingingly secured upon the opposite sections of said base.

2. In an article of the character described, a base composed of two sections slidably connected, each section being provided, adjacent its inner face, with a pair of oppositely disposed forked brackets, holding elements in said base, operating levers swivelly connected with each other intermediate their ends and swingingly secured in said brackets.

3. In an article of the character described, a base composed of two sections slidably connected, each of said sections being provided, adjacent its inner edge, with a pair of oppositely disposed brackets, holding elements in said base, operating levers swivelly connected intermediate their ends and having their inner ends swingingly secured in said brackets, each of said levers being provided at its outer end with a tubular extension, a pair of standards slidably engaging said tubular extensions and tied together with a cross-bar.

In testimony whereof I have hereunto affixed my signature in the presence of two witnesses.

JOSEPH SCIORTINO.

Witnesses:
RICHARD E. FRANCIS,
JOHN G. GOELTY.